No. 779,444. PATENTED JAN. 10, 1905.
B. C. ROWELL.
PNEUMATIC TIRE.
APPLICATION FILED MAR. 15, 1904.
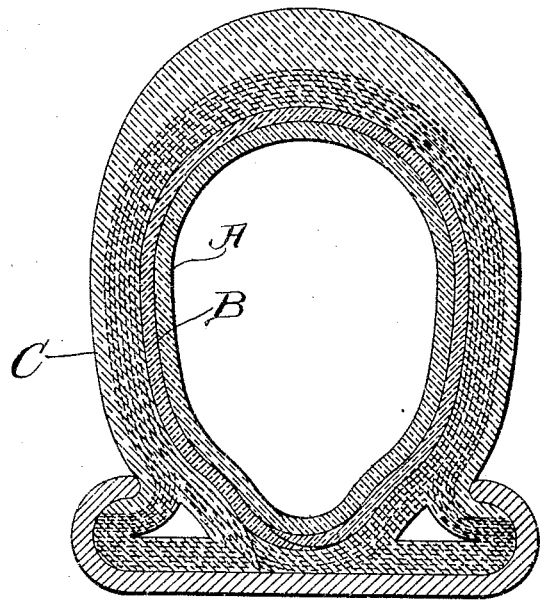
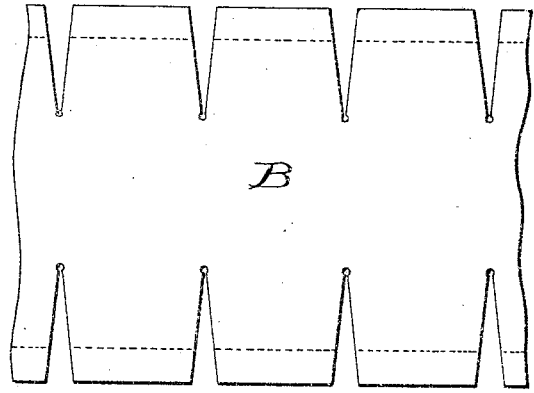

No. 779,444.

Patented January 10, 1905.

UNITED STATES PATENT OFFICE.

BENTON C. ROWELL, OF CHICAGO, ILLINOIS.

PNEUMATIC TIRE.

SPECIFICATION forming part of Letters Patent No. 779,444, dated January 10, 1905.

Application filed March 15, 1904. Serial No. 198,196.

*To all whom it may concern:*

Be it known that I, BENTON C. ROWELL, of Chicago, Cook county, and State of Illinois, have invented an Improved Pneumatic Tire, of which the following is a specification, reference being had to the drawings making a part hereof.

The class of tires to which my invention relates is the now well-known class consisting of an inflatable inner tube, commonly called a "bladder," which is inflated by an air-pump and is used within an outer tube, which forms the tire proper and which protects the bladder from wear and puncturing.

My invention is an intermediate sheath of tough, flexible, and strong sheet material—such as rawhide, leather, or the like—surrounding the inflatable tube or bladder and between it and the outer tube or tire proper.

In making my bladder-sheath I prefer to use a strip cut from the skin and form it into an annular tube by notching it at its edges and securing the edges together. The tube thus formed is fitted over the bladder and its ends secured together; but some kinds of hides can be so cured that the strip will stretch sufficiently to enable the sheath to be formed and fitted over the bladder without notching the edges of the blank, as will be obvious to all skilled leather-workers.

In the drawings, Figure 1 is a cross-section of my improved tire in place on a wheel-rim. Fig. 2 is a plan of a portion of the strip from which the bladder-sheath is made. Fig. 3 is an elevation of a portion of the bladder-sheath.

My compound bladder composed of the inner inflatable tube A and my bladder-sheath of skin B is used within the outer tube or tire proper, C, in the same manner as now customary with tires of the class above named, the construction of the inner tube or bladder A and of the outer tube or tire proper, C, being familiar to all skilled in the art. As the outer and inner surfaces of the bladder B differ, being one grain and the other flesh, I prefer to use the grain surface outermost, as I believe that it is rather better to have the grain side of the skin tube next the inner surface of the outer tube C; but the difference is slight. The point of my invention is that the bladder A is within a bladder-sheath B of skin which is very flexible even while under strain from the air-pressure within the bladder and which sheath B is so strong that the air-pressure can be safely raised as high as the weight of even the heaviest automobile requires—say four hundred or five hundred pounds to the square inch—without unduly stretching the sheath B and bringing undue internal strain on the outer tube C.

Tires made with my intermediate sheath of rawhide or its equivalent skin are practically non-puncturable, can be pumped up and maintained at much higher pressures than heretofore, the intermediate sheath taking much of the internal pressure off the outer sheath and the character of the intermediate sheath being peculiarly well adapted for contact with the inner surface of the outer tube C and the outer surface of the bladder A.

The inner tube A is endless and without seam. The intermediate tube B has a seam about its inner circumference and at its ends, while the outer tube C has a seam about its inner circumference only, and the rim of the wheel is so shaped as to overlap flanges formed at the sides of, and thereby hold the tube C and the tubes A and B within it firmly to the wheel, when the pressure of the air confined within the tube A forces the tubes A and B firmly against all portions of the interior of tube C, while the fact that tube B cannot stretch when thus clamped against the practically non-stretchable outer tube C and the further fact that the seam at the inner circumference of tube B is supported at the periphery of the practically rigid rim of the wheel and by the practically non-stretchable walls of the seamed portion of tube C reduces all motion of the seamed portions of the tubes B and C to a minimum, which is essential in my improved tire.

I am aware of Letters Patent to Preston Davies, No. 486,542, dated November 22, 1892, and disclaim all that is shown in that patent.

What I claim as my invention is—

The improved tire above described comprising an inner inflatable bladder; an outer protecting-tube with a seam about its inner circumference; and an intermediate sheath of strong tough hide, with a seam about its inner circumference, all adapted to be secured to the wheel-rim and each tube to the others substantially as described.

BENTON C. ROWELL.

Witnesses:
ROBERT TARRANT,
CHAS. J. DE BERARD.